(12) United States Patent
O'Neill et al.

(10) Patent No.: US 7,967,949 B2
(45) Date of Patent: * Jun. 28, 2011

(54) PACKAGING DEVICE AND METHOD FOR ABSORBING MOISTURE

(76) Inventors: Kevin J. O'Neill, Lloyd Harbor, NY (US); Albert J. Salese, Huntington, NY (US)

( * ) Notice: Subject to any disclaimer, the term of this patent is extended or adjusted under 35 U.S.C. 154(b) by 301 days.

This patent is subject to a terminal disclaimer.

(21) Appl. No.: 12/016,792

(22) Filed: Jan. 18, 2008

(65) Prior Publication Data

US 2008/0113129 A1     May 15, 2008

Related U.S. Application Data

(63) Continuation of application No. 11/248,844, filed on Oct. 12, 2005, now Pat. No. 7,320,742, which is a continuation of application No. 10/774,925, filed on Feb. 9, 2004, now Pat. No. 7,005,035, which is a continuation-in-part of application No. 10/140,755, filed on May 7, 2002, now abandoned.

(51) Int. Cl.
*D21F 11/00*     (2006.01)

(52) U.S. Cl. .......................... 162/114; 428/137; 428/182

(58) Field of Classification Search .................. 162/114, 162/138, 132, 135, 184; 229/939, 120; 206/524.1; 428/137, 182
See application file for complete search history.

(56) References Cited

U.S. PATENT DOCUMENTS

| 2,593,146 | A | * | 4/1952 | Howard | 428/530 |
| 4,606,790 | A | * | 8/1986 | Youngs et al. | 162/125 |
| 7,005,035 | B2 | * | 2/2006 | O'Neill et al. | 162/114 |

* cited by examiner

*Primary Examiner* — Mark Halpern
(74) *Attorney, Agent, or Firm* — F. Chau & Associates, LLC

(57) ABSTRACT

A packaging device and method for absorbing and reducing moisture as well as a manufacturing process for such device. The packaging device is a container made from paperboard such as containerboards or linerboards with a corrugated medium. The paperboard is insulated with moisture absorbing additives comprising charcoal, activated charcoal, activated carbon, or substances mostly comprised of carbon. Perforations may be added in the boards to further permit moisture to reach the corrugated medium, permitting further absorption by the additives embedded within the corrugated medium in between the boards. This packaging device and method is favorable for storing or transporting objects which are sensitive to or would benefit from low moisture/humidity conditions.

8 Claims, 2 Drawing Sheets

PACKAGING DEVICE AND METHOD FOR ABSORBING MOISTURE

This application is a continuation of application Ser. No. 11/248,844, filed on Oct. 12, 2005 now U.S. Pat. No. 7,320, 742, which is a continuation of application Ser. No. 10/774, 925 filed on Feb. 9, 2004 now U.S. Pat. No. 7,005,035, which is a continuation-in-part of application Ser. No. 10/140,755 filed on May 7, 2002 now abandoned, the disclosure of all applications in their entirety is incorporated by reference herein.

BACKGROUND OF THE INVENTION

1. Field of the Invention

The invention is directed to a packaging device and method for absorbing moisture, steam, or condensation through the use of embedded carbon-containing substances.

2. Discussion of Related Art

A problem with packaging of goods arises when the packaging creates an environment which negatively affects the packaged content. One example is the packaging of fine art or other materials which decay or go bad when moisture or a humid condition is trapped. Another example is the negative effect on packaged food due to steam vapor in a container such as a paper box or bag. The steam that emanates from a hot food such as pizza, french fries, etc. forms condensation that settles within the box or bag, making the pizza or french fries soggy or spongelike. In the case of packaging used for temporarily storing and transporting a hot pizza pie, the packaging is typically a box constructed of either corrugated boxboard, or containerboard. Corrugated boxboard is made by gluing an accordion-like sheet of paper (corrugated medium) in between two sheets of linerboard. Containerboard, or what is also called 'clay kraft back' is a paperboard that does not have any corrugated layer. Containerboard is commonly used for forming boxes such as a shoe box.

The condensation that settles on the inside bottom surface of the pizza box is absorbed by the pizza dough by the time the pizza is transported to a place where it can be consumed. Similarly, the Kraft Paper commonly used as grocery bags for temporarily housing other hot food such as french fries, fried chicken, etc. also cannot absorb the vapor from the hot food. The trapped vapor renders the french fries soggy.

Accordingly, it is desirous to have a packaging device and method capable of absorbing moisture, steam, or condensation.

SUMMARY OF THE INVENTION

According to an embodiment of the present invention, a container for housing food is provided, comprising paper having carbon additives for absorbing moisture emanating from the food, wherein the carbon additives include one of charcoal, activated charcoal and activated carbon, wherein the paper is one of a containerboard, a linerboard, and a corrugated medium.

According to an aspect of the present invention, the container, preferably a corrugated boxboard, includes a plurality of sheets or linerboards, and the carbon additives are embedded in at least one of the plurality of sheets or linerboards, wherein the sheets of paper are made from a mixture of pulp, water, and the carbon additives.

Preferably, one, two, or three of the plurality of sheets is/are selectively embedded with the carbon additives. In one embodiment, one of the plurality of sheets is corrugated and another sheet is perforated.

A method is also provided for absorbing moisture from food within a container comprising; embedding carbon additives within paper, and forming the container using the paper. Preferably, the carbon additives include charcoal, activated charcoal and activated carbon. The paper is one of a linerboard, a containerboard, and a corrugated medium. The paper includes a plurality of sheets, each sheet formed from a plurality of layers, and the carbon additives are embedded in at least one of the plurality of sheets. The sheets of paper are made from a mixture of pulp, water, and the carbon additives, wherein one, two or three of the plurality of sheets are embedded with the carbon additives.

According to another embodiment of the invention, the plurality of sheets include an inner sheet and a corrugated sheet, the inner sheet having perforations and the corrugated sheet having the embedded carbon additives.

A process for manufacturing a container for storing food is also provided, comprising; forming layers of paper with embedded carbon additives by mixing pulp, water, and the carbon additives; and forming a boxboard with a plurality of sheets of linerboards of the paper to house the food, wherein the step of forming a box includes using a plurality of layers of paper forming sheets or linerboards, including at least an inner linerboard and an outer linerboard. The process further including adding perforations to the inner linerboard and corrugating one of the plurality of sheets of paper.

BRIEF DESCRIPTION OF THE DRAWINGS

Other uses and features of the present invention will become apparent from the following detailed description considered in connection with the accompanying drawings which disclose several embodiments of the present invention. It should be understood, however, that the drawings are designed for the purpose of illustration only and not as an exhaustive list of its possible uses.

In the drawings wherein similar reference characters denote similar elements throughout the different embodiments.

DETAILED DESCRIPTION OF THE PREFERRED EMBODIMENTS

The invention is directed to packaging product for housing goods. The packaging product is preferably made of paperboard, linerboard, or containerboard having charcoal, activated charcoal, or activated carbon as an additive for absorbing moisture, vapor, or condensation (hereinafter referred to as "Coalboard"). Charcoal, activated charcoal, carbon, or substances mostly comprised of carbon are used as additives because of their superior absorbent characteristics, partly due to their extremely vast surface area. The charcoal, activated charcoal, activated carbon, or substances mostly comprised of carbon is mixed with the wood fiber (more commonly known as pulp) in the blend chest. The refined pulp and water with the charcoal, activated charcoal, activated carbon, or substances mostly comprised of carbon added would then be sent on to the papermaking machine. In one embodiment, the linerboard with the embedded charcoal is disposed within a packaging container which is perforated on the interior side to enable steam vapor or humidity to enter into the corrugated medium. In another embodiment, a boxboard is made of containerboard with embedded charcoal, activated charcoal or substances mostly comprised of carbon. With this packaging and method according to the present invention, the contents of the package can be protected against humidity, moisture, and steam.

Figure 1:
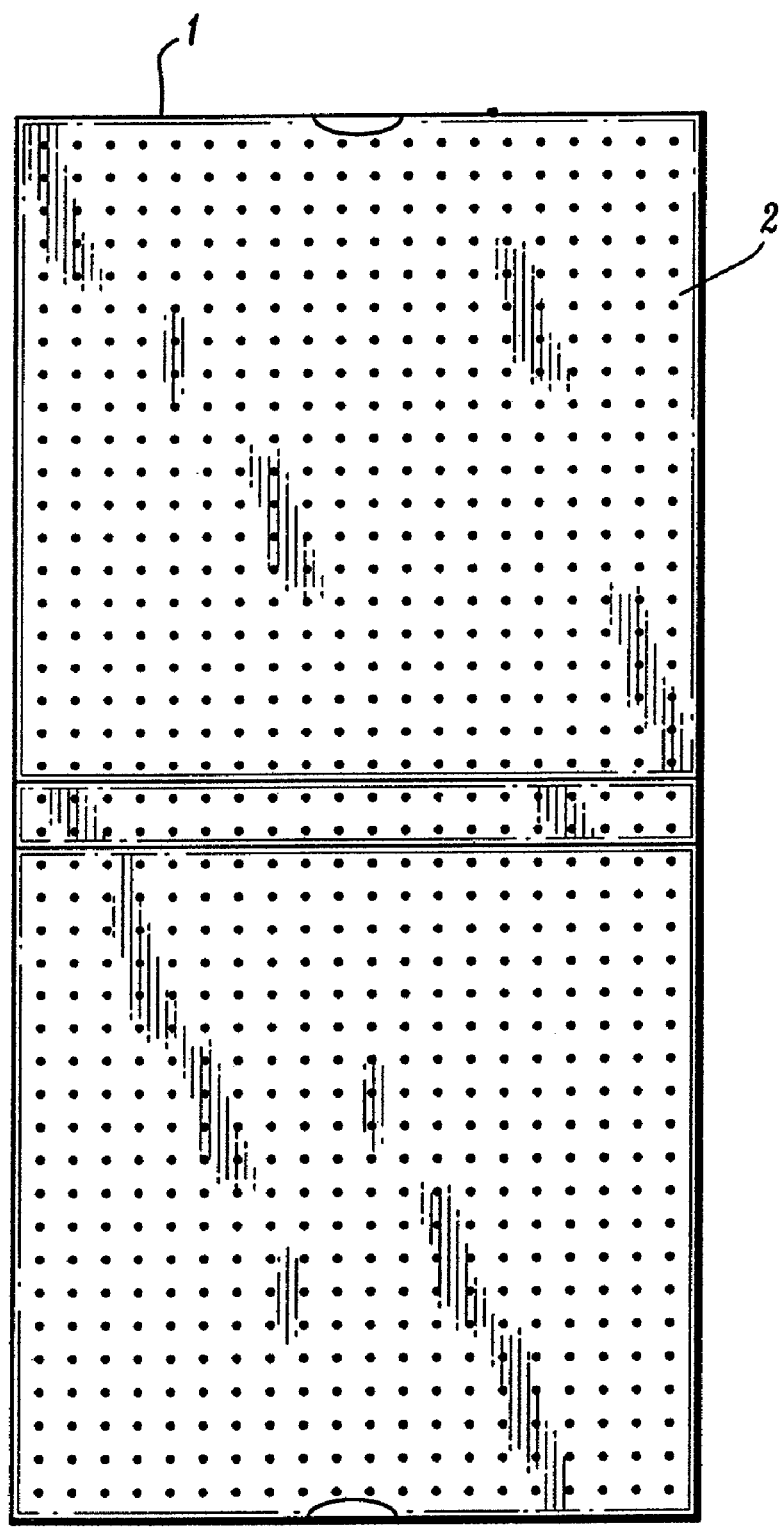
FIG. 1 shows a paper box in an opened configuration according to the present invention.

FIG. 1 shows a pizza box made of Coalboard according to the present invention. The steam vapor that is emitted from the pizza would be drawn through the perforations and be absorbed by the charcoal. It is readily apparent that pizza is only one example of packaged food that would benefit from the vapor absorbing qualities of CoalBoard. Although this is one embodiment of the present invention, it is not the exclusive embodiment.

Figure 2:
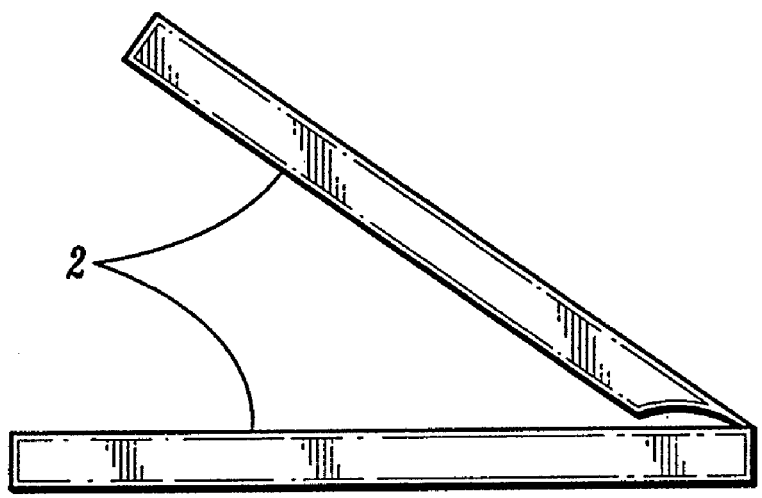
FIG. 2 shows a sideview of the paper box.
Figure 3:
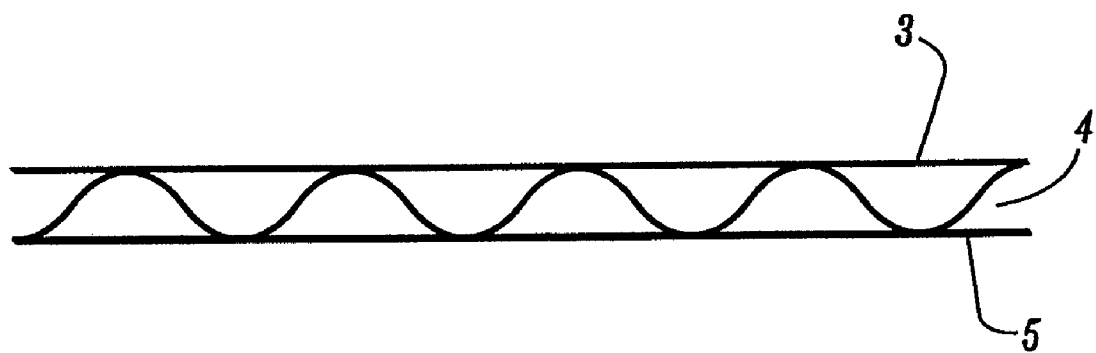
FIG. 3 shows a cross-sectional view of a corrugated medium in a boxboard.

Referring to FIGS. 1 to 3 and according to a first embodiment of the present invention, all three sheets of the boxboard 1, which comprises exterior linerboard 3, interior linerboard 5, and corrugated medium 4 are embedded with charcoal, activated charcoal, activated carbon, or substances mostly comprised of carbon. The interior linerboard 5 that faces the food product includes perforations 2 to enable the steam vapor generated from the hot food to enter into the corrugated medium 4.

According to a second embodiment of the invention, two sheets of the boxboard 1, preferably interior linerboard 5, and corrugated medium 4 are embedded with charcoal, activated charcoal, activated carbon, or substances mostly comprised of carbon as an additive. The interior linerboard 5 facing the food product is preferably perforated 2 to enable the steam vapor generated from the hot food to enter into the corrugation 4.

According to a third embodiment of the invention, the exterior linerboard 3, and corrugated medium 4 are embedded with charcoal, activated charcoal, activated carbon, or substances mostly comprised of carbon as an embedded additive. The interior linerboard 5 facing the food product would be perforated 2 to enable the steam vapor generated from the hot food to enter into the corrugation 4.

According to a fourth embodiment of the invention, one sheet of the boxboard 1, preferably the interior linerboard 5 is embedded with charcoal, activated charcoal, carbon, or substances mostly comprised of carbon as an embedded additive. The interior linerboard 5 facing the food product would be perforated 2 to enable the steam vapor generated from the hot food to enter into the corrugation 4.

According to a fifth embodiment of the invention, the exterior linerboard 3 is the only sheet having charcoal, activated charcoal, carbon, or substances mostly comprised of carbon as an embedded additive. The interior linerboard 5 facing the food product would be perforated 2 to enable the steam vapor to enter into the corrugation 4.

According to a sixth embodiment of the invention, the corrugated medium 4 is the sheet having charcoal, activated charcoal, carbon, or substances mostly comprised of carbon as an embedded additive. The interior linerboard 5 facing the food product would be perforated 2 to enable the steam vapor generated from the hot food to enter into the corrugation 4.

According to a seventh embodiment of the invention, the boxboard is made from containerboard having charcoal, activated charcoal, carbon, or substances mostly comprised of carbon as an embedded additive. In this embodiment, the boxboard does not include a corrugated medium.

As an alternative to mixing the additive in the pulp formulation process, there are a number of processes that can be used to introduce charcoal, activated charcoal, activated carbon, or substances mostly comprised of carbon into paper. One exemplary process is by blade coating, which is a method of coating paper and paperboard using a flexible blade to control the amount of coating applied to the paper. Blade-coating can take place either on a papermaking machine or on an off-machine coater. The paper may be coated on one side (C1S) or both sides (C2S), or between layers of paper as described in the above embodiments. Off-machine coating refers to coating paper after it comes off the papermaking machine rather than while it is still on the machine. Preferably, an off-machine coater is used to add one or more layer of coating of the carbon material to the paper. Other known processes such as bath coating or surface sizing coating may also be used to mix or coat the carbon material onto the paper.

We did four side-by-side tests with identical pizza pies under the identical conditions. We lined the perimeter of one of the boxes with pulverized charcoal, and left the other box as it would normally be used. After nine minutes cooking at 500 degrees (industry standard), we placed both pies in their respective boxes and let them settle for 5, 7, 10, and 15 minutes. The first three tests were conducted as stated above, the third test we perforated an additional box top and stapled it to the actual top with charcoal sandwiched in between. In each case, the pizza that was in the box with the charcoal was noticeably more crispy. The longer the period of time that we let the pies settle, the more pronounced the effect.

Having thus described the invention with the details and particularity required by the patent laws, it is noted that modifications and variation can be made by persons skilled in the art in light of the above teachings. It is therefore to be understood that changes may be made in the particular embodiments of the invention disclosed which are within the scope and spirit of the invention as defined by the appended claims.

What is claimed is:

1. A method for manufacturing a boxboard formed by a plurality of sheets of paper, comprising:
   providing an inner liner board sheet;
   adding perforations to the inner liner board sheet;
   providing an outer liner board sheet more resistant to the flow of air than the inner liner board sheet;
   corrugating a middle sheet having activated carbon or charcoal; and
   affixing the corrugated middle sheet between the outer liner board sheet and the inner liner board sheet.

2. The method of claim 1, wherein the corrugated middle sheet is coated with the activated carbon or charcoal.

3. The method of claim 1, wherein the corrugated middle sheet comprises carbon additives.

4. The method of claim 1, additionally comprising forming the boxboard into a container box such that the outer liner board sheet defines an exterior of the container box and the inner liner board sheet defines an interior of the container box.

5. The method of claim 1, wherein the middle sheet is coated with the activated carbon or charcoal prior to affixing the middle sheet.

6. The method of claim 5, wherein coating the middle sheet includes using one of a paper making machine or an off-machine coating.

7. The method of claim 5, wherein coating the middle sheet includes bath coating or surface sizing coating.

8. The method of claim 1, wherein activated carbon is embedded in the middle sheet by mixing pulp, water and activated carbon.

* * * * *